United States Patent
Köhler

(10) Patent No.: US 7,109,470 B2
(45) Date of Patent: Sep. 19, 2006

(54) SENSOR ARRANGEMENT AND CONTROL AND ANALYSIS UNIT FOR IMAGE RECOGNITION OF AN OBJECT

(75) Inventor: Thorsten Köhler, Deuerling (DE)

(73) Assignee: Siemens Aktiengesellschaft, München (DE)

( * ) Notice: Subject to any disclaimer, the term of this patent is extended or adjusted under 35 U.S.C. 154(b) by 330 days.

(21) Appl. No.: 10/380,939

(22) PCT Filed: Aug. 17, 2001

(86) PCT No.: PCT/DE01/03165

§ 371 (c)(1),
(2), (4) Date: Mar. 19, 2003

(87) PCT Pub. No.: WO02/25741

PCT Pub. Date: Mar. 28, 2002

(65) Prior Publication Data

US 2003/0189173 A1    Oct. 9, 2003

(30) Foreign Application Priority Data

Sep. 19, 2000   (DE) ................................ 100 46 309

(51) Int. Cl.
G01J 3/50    (2006.01)
G01J 5/02    (2006.01)

(52) U.S. Cl. ................. 250/226; 250/339.05

(58) Field of Classification Search ............... 250/226, 250/208.1, 341.8, 339.05; 348/162, 272–279; 358/512; 356/405, 419, 420
See application file for complete search history.

(56) References Cited

U.S. PATENT DOCUMENTS

| | | | | |
|---|---|---|---|---|
| 4,878,113 A | * | 10/1989 | Nakamura | 348/71 |
| 5,077,784 A | | 12/1991 | Fujita et al. | 379/53 |
| 5,574,511 A | * | 11/1996 | Yang et al. | 348/586 |
| 6,292,212 B1 | | 9/2001 | Zigadlo et al. | 348/33 |
| 6,293,911 B1 | * | 9/2001 | Imaizumi et al. | 600/160 |
| 6,389,153 B1 | * | 5/2002 | Imai et al. | 382/106 |
| 6,433,817 B1 | * | 8/2002 | Guerra | 348/157 |

FOREIGN PATENT DOCUMENTS

| | | |
|---|---|---|
| EP | 0 605 259 A2 | 7/1994 |
| EP | 0 605 898 A1 | 7/1994 |
| WO | WO 00/07365 | 2/2000 |

* cited by examiner

*Primary Examiner*—Thanh X. Luu
(74) *Attorney, Agent, or Firm*—Cohen, Pontani, Lieberman & Pavane

(57) ABSTRACT

A sensor arrangement for image recognition includes a plurality of optical sensor elements (R,G,B) of a first type, the sensor elements being arranged in a raster layout and responding to light in the visible wavelength range. The sensor arrangement also includes further sensor elements (IR) of a second type. The further sensor elements respond to light in the invisible wavelength range.

21 Claims, 2 Drawing Sheets

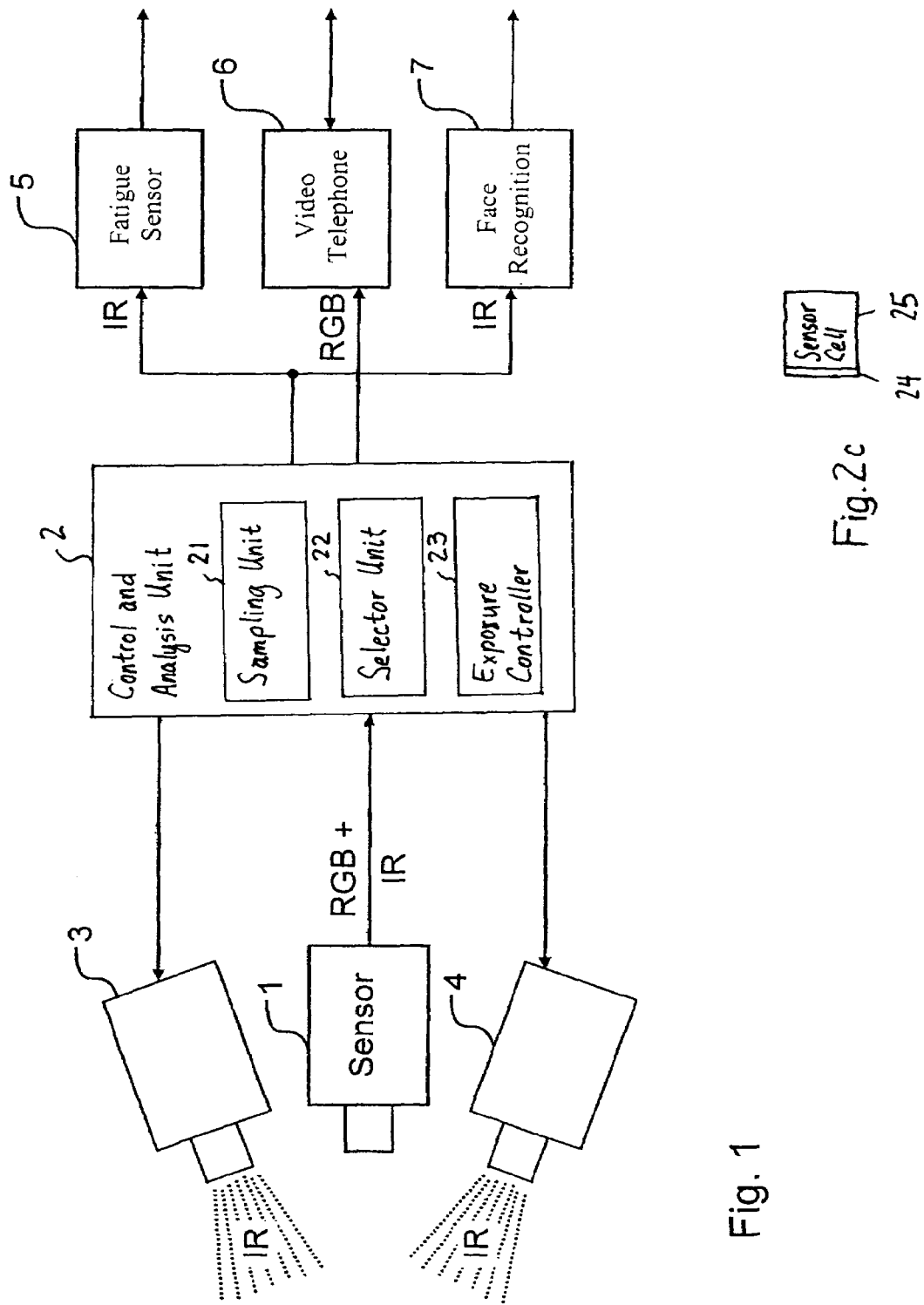

SENSOR ARRANGEMENT AND CONTROL AND ANALYSIS UNIT FOR IMAGE RECOGNITION OF AN OBJECT

CROSS-REFERENCE TO RELATED APPLICATIONS

This is a U.S. national stage of application No. PCT/DE01/03165, filed on Aug. 17, 2001. Priority is claimed on the following application, Country: Germany, Application No.: 100 46 309.6, Filed: Sep. 19, 2000.

BACKGROUND OF INVENTION

1. Field of the Invention

The present invention relates to a sensor arrangement for image recognition, having a plurality of optical sensor elements arranged in a raster layout and responding to light in the visible wavelength range.

2. Description of the Prior Art

It is known that a digital camera can be arranged in a motor vehicle in order to photograph an image of the driver, wherein the image of the driver photographed by the camera can be analyzed in different ways.

One possible technical application comprises connecting the camera to a video telephone in order to allow a video telephone transmission from the motor vehicle.

A further technical application comprises a fatigue detection system in which images of the driver's face are photographed during the journey, the fatigue state of the driver being derived from the frequency of blinking, for example.

Finally, the image of the driver photographed by the camera can also be used to identify the driver, in order to permit the use of the motor vehicle only by a specific person with a predetermined physiognomy, while disabling the motor vehicle for other people.

A problem arises in this context, in that precisely defined light conditions must be present for both the fatigue detection and the person identification, in order to prevent an erroneous identification due to fluctuating light conditions. Therefore, for the purpose of fatigue detection and person identification, the use of an infrared camera is known, so that exactly defined lighting conditions can be created by means of infrared spotlights.

However, this has the disadvantage that, in addition to the daylight-sensitive camera for the video telephone, an infrared camera is required for the fatigue detection and the person identification.

EP 0 605 259 A2 discloses an optical sensor arrangement as a component of a copying device, which arrangement has both sensor elements for visible light and sensor elements for infrared light. In this context, however, a halogen lamp is used to provide broadband lighting of the photograph object, the halogen lamp triggering both the sensor elements for visible light and the sensor elements for infrared light. Therefore the known sensor arrangement requires optical filters for image separation.

SUMMARY OF THE INVENTION

The invention therefore addresses the problem of creating an optical sensor arrangement for image recognition, which sensor arrangement allows the use of a single camera for a fatigue detection or a person identification under exactly defined light conditions, and for taking photographs of normal images, for example for a video telephone.

The invention includes the general technical teaching of providing, in a sensor arrangement for image recognition having a plurality of optical sensor elements arranged in a raster layout, sensor elements which respond to light in the visible wavelength range, and sensor elements which respond to light in the invisible wavelength range. The sensors which respond to light in the visible wavelength range are used in this context to photograph a normal monochromatic or polychromatic image, i.e., for a video telephone. The sensor elements which respond to light in the invisible wavelength range are capable of photographing an image of the driver under exactly defined light conditions, since the interfering influence of the environmental lighting does not apply.

The sensor elements of the second type, which respond to light in the invisible wavelength range, are preferably infrared sensor elements, though the sensor elements of the second type can also respond to light in other wavelength ranges. It is however essential that the sensor elements of the second type do not capture the normal environmental lighting, so that defined light conditions can be created by means of an artificial lighting for the fatigue detection and the person identification.

The individual sensor elements can comprise, for example, a light-sensitive cell to which a color filter is attached, the color filters attached to the sensor elements of the first type preferably being sensitive in the red, green and blue range, and the color filters attached to the sensor elements of the second type preferably allowing the transmission of light in the infrared range.

The sensor arrangement preferably features a plurality of adjacent modules arranged in a raster layout, said modules including at least one sensor element of the first type and at least one sensor element of the second type. Individual modules can be square, for example, featuring three sensor elements of the first type, which respond to light in the three elementary colors red, green and blue, together with a sensor element of the second type, which responds to light in the infrared range.

The sensor elements of the first type and the sensor elements of the second type can be connected to a shared electric output, in which the separation of the different images takes place by means of separate hardware or software. However, it is also possible for the sensor elements of the first type to be connected to a first electric signal output, while the sensor elements of the second type are connected to a second electric signal output, such that the different images are presented separately at the two signal outputs.

In the preferred embodiment, the distribution density of the sensor elements of the first type is significantly greater than the distribution density of the sensor elements of the second type. However, a plurality of sensor elements of the first type normally form a raster point together, whereas each sensor element of the second type preferably forms a separate raster point, so that the raster density (pixel density) for both types of sensor element is preferably equal.

Additionally, in accordance with the preferred embodiment of the invention, at least one spotlight is provided for lighting the image object, which spotlight emits light of a wavelength to which only the sensor elements of the second type respond. This is important so that defined light conditions can be created for the person identification and if applicable for the fatigue detection, while the spotlight must not interfere with the capture of the normal image, for example for the video telephone. The spotlight can comprise one or more infrared light-emitting diodes for this purpose.

Furthermore, in a variant of the invention, provision is also made for the sensor elements to be connected to a selector unit which selects alternatively one of the two images, wherein the selector unit is preferably connected to the spotlight in order to synchronize the activation of the spotlight with the selection of the sensor element. The lighting of the image object with light in the invisible wavelength range therefore only occurs when the selector unit also selects the sensor elements of the second type, whereas the spotlight can remain extinguished at other times.

In a further variant of the invention, provision is also made for connecting the sensor elements to an exposure controller in order to set the exposure duration of the sensor elements. The exposure controller preferably has two settings with different exposure durations. This is advantageous, since a long exposure duration is required when photographing an image for a video telephone, whereas very short exposure durations are useful for fatigue detection.

In accordance with a variant of the invention, provision is made for a sampling unit which samples, at a predetermined image refresh rate, the images generated by the sensor elements. The sampling unit preferably samples alternately both the sensor elements of the first type and the sensor elements of the second type in a first sampling step, and only the sensor elements of the second type in a subsequent second sampling step. In this way, different image refresh rates are produced for the normal RGB image on the one hand and the IR image on the other hand, which satisfies the technical requirements described above in respect of the different technical applications. In this context, typical image refresh rates are 50 Hertz for the IR image and 25 Hertz for the RGB image.

It should also be noted that the sensor arrangement according to the invention can also be used, for example, in mobile devices such as mobile telephones. Use of the sensor arrangement according to the invention is particularly advantageous in UMTS mobile telephones. Use in a mobile telephone of the sensor arrangement according to the invention therefore allows user identification, for example, by recording an infrared image of the user under defined IR lighting conditions. The use of the mobile telephone is only then enabled if the user identification indicates that the user is authorized. Furthermore, use in a mobile telephone of the sensor arrangement according to the invention allows an image transmission by means of an infrared image under poor light conditions.

BRIEF DESCRIPTION OF THE DRAWINGS

Other advantageous variants and developments of the invention are characterized in the dependent claims and explained below in greater detail together with the description of the preferred exemplary embodiment and with reference to the figures, in which:

FIG. 1 is a block diagram showing a sensor arrangement according to the present invention.

FIG. 2c shows a light-sensitive cell with a color filter attached.

DETAILED DESCRIPTION OF THE PREFERRED EMBODIMENTS

Figure 2A:
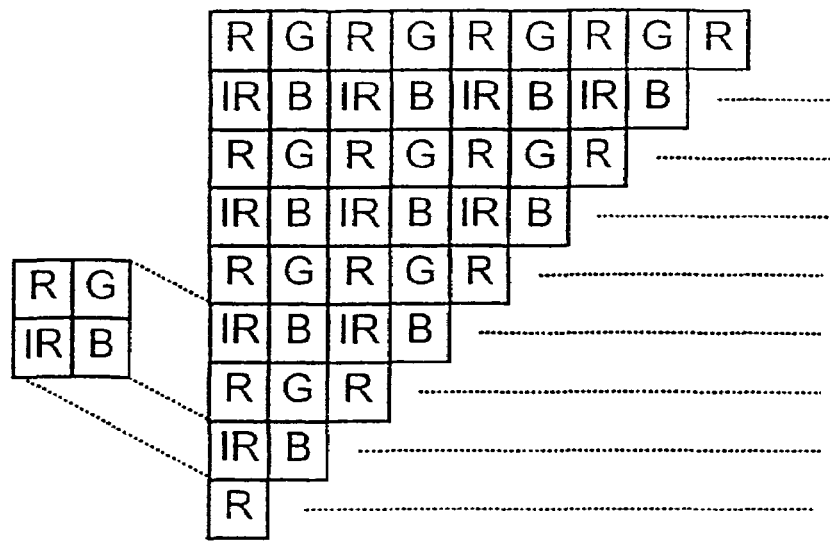
FIG. 2a is a schematic diagram of a raster mask with a plurality of sensor elements.

The sensor arrangement illustrated in FIG. 1 is used for recording the face of the driver in a passenger motor vehicle. For this, the sensor arrangement has an optical sensor 1, which can be arranged in the roof paneling of the vehicle, for example, and is directed at the face of the driver. The optical sensor has a multiplicity of CCD sensor elements or CMOS sensor elements, which are distributed in a raster layout on a plane as illustrated in FIG. 2a. The individual sensor elements are arranged in lines and columns in a raster layout in accordance with FIG. 2a, in which alternate sensor elements responding to red and green light respectively are arranged on the odd lines, while alternate sensor elements responding to infrared and blue light respectively are arranged on the even lines. Consequently, the raster arrangement in accordance with figure 2a comprises a multiplicity of square modules which contain three sensor elements of a first type being responsive to visible light, and one sensor element of a second type being responsive to infrared light.

On the output side, the sensor 1 is connected to a control and analysis unit 2, which has a plurality of functions as described below.

Firstly, the control and analysis unit 2 functions as a sampling unit 21, and samples the individual sensors elements in sequence, the sensor elements of the first type being sampled before the sensor element of the second type in each module.

Secondly, the control and analysis unit 2 operates as a selector unit 22 and provides a normal color image RGB and an infrared image IR separately on the output side. An exposure controller 23 is used to set the exposure duration of the sensor elements.

Finally, the control and analysis unit 2 is responsible for generating defined light conditions during the person identification and during the fatigue detection. For this, the control and analysis unit 2 is connected to two spotlights 3, 4 on the output side, which spotlights imitate light in the infrared wavelength range in the direction of the driver. The spotlights 3, 4 comprise infrared light-emitting diodes which are arranged adjacently to the sensor 1.

On the output side, the control and analysis unit 2 is connected to a fatigue sensor 5, a video telephone 6 and a face recognition unit 7, which are only illustrated schematically for simplification.

Figure 2B:
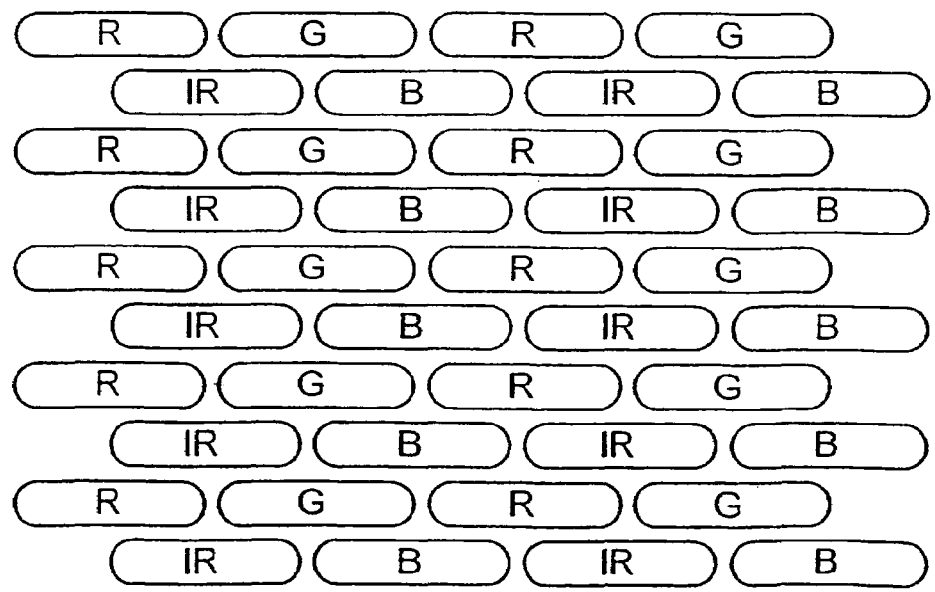
FIG. 2b is a schematic diagram of an alternative raster mask.

FIG. 2b shows an alternative arrangement of the sensor elements which are distributed in a raster layout, in which the individual sensor elements are designed and arranged in strip format. Each sensor element in FIGS. 2a and 2b may comprise a light-sensitive cell 25 to which a color filter 24 is attached as shown in FIG. 2c.

The invention is not restricted to the preferred exemplary embodiment described above. On the contrary, it is possible to conceive of a multiplicity of variants and adaptations which make use of the inventive idea and therefore likewise fall within the scope of protection.

The invention claimed is:

1. A sensor arrangement for image recognition of an image object, comprising:
   a plurality of first optical sensor elements arranged in a raster layout and responding to light in a visible wavelength range;
   a plurality of second optical sensor elements responding to light in an invisible wavelength range, wherein said plurality of second optical sensor elements are arranged in the raster layout between the plurality of first optical sensor elements;

a spotlight emitting light with a wavelength only within the invisible wavelength range; and a selector unit connected to said plurality of first optical sensor elements and said plurality of second optical sensor elements for selecting one of said plurality of first optical sensor elements and said plurality of second optical sensor elements, said selector element further connected to said spotlight for selectively activating said spotlight such that the activation of said spotlight is synchronized with the selection of said plurality of second optical sensor elements by said selector unit and deactivation of said spot light is synchronized with the selection of said plurality of first optical sensor elements by said selector unit.

2. The sensor arrangement of claim 1, wherein said invisible wavelength range is an infrared wavelength range.

3. The sensor arrangement of claim 1, wherein each of said sensor elements of said plurality of first optical sensor elements and said plurality of second optical sensor elements includes a light sensitive cell and a color filter.

4. The sensor arrangement of claim 1, wherein said raster layout comprises a plurality of modules arranged adjacently, each of said plurality of modules including at least one of said plurality of first optical sensor elements and at least one of said plurality of second optical sensor elements.

5. The sensor arrangement of claim 4, wherein sensor elements of said plurality of first optical sensor elements are connected to a first electric signal output and sensor elements of said plurality of second optical sensor elements are connected to a second electric signal output.

6. The sensor arrangement of claim 5, wherein a distribution density of said plurality of first optical sensor elements in said raster layout is greater than a distribution density of said plurality of second optical sensor elements in said raster layout.

7. The sensor arrangement of claim 6, wherein the distribution density of said plurality of first optical sensor elements is three times greater than the distribution density of said plurality of second optical sensor elements.

8. The sensor arrangement of claim 7, wherein said spotlight comprises an infrared light-emitting diode.

9. The sensor arrangement of claim 1, wherein sensor elements of said plurality of first optical sensor elements are connected to a first electric signal output and sensor elements of said plurality of second optical sensor elements are connected to a second electric signal output.

10. The sensor arrangement of claim 9, wherein a distribution density of said plurality of first optical sensor elements is greater than a distribution density of said plurality of second optical sensor elements.

11. The sensor arrangement of claim 10, wherein the distribution density of said plurality of first optical sensor elements is three times greater than the distribution density of said plurality of second optical sensor elements.

12. The sensor arrangement of claim 11, wherein said spotlight comprises an infrared light-emitting diode.

13. The sensor arrangement of claim 1, wherein said selector unit comprises an exposure controller for setting the exposure duration of said first optical sensor elements and said second optical sensor elements.

14. The sensor arrangement of claim 13, wherein said exposure controller has two settings with different exposure durations.

15. The sensor arrangement of claim 1, wherein said selector unit comprises a sampling unit which samples images generated by said plurality of first optical sensor elements and said plurality of second optical sensor elements.

16. The sensor arrangement of claim 15, wherein said sampling unit alternately samples the sensor elements of said plurality of first optical sensor elements and said plurality of second optical sensor elements in a first sampling step and samples the sensor elements of said plurality of second optical sensor elements in a second sampling step.

17. The sensor arrangement of claim 1, wherein said sensor elements are CCD elements.

18. The sensor arrangement of claim 1, wherein said sensor elements are CMOS elements.

19. A sensor arrangement for image recognition of an image object, comprising:

a plurality of first optical sensor elements arranged in a raster layout and responding to light in a visible wavelength range;

a plurality of second optical sensor elements responding to light in an invisible wavelength range, wherein said plurality of second optical sensor elements are arranged in the raster layout between the plurality of first optical sensor elements;

a spotlight emitting light with a wavelength only within the invisible wavelength range;

a selector unit connected to said plurality of first optical sensor elements and said plurality of second optical sensor elements for selecting one of said plurality of first optical sensor elements and said plurality of second optical sensor elements, said selector element further connected to said spotlight for selectively activating said spotlight such that the activation of said spotlight is synchronized with the selection of said plurality of second optical sensor elements by said selector unit and deactivation of said spot light is synchronized with the selection of said plurality of first optical sensor elements by said selector unit: and a video telephone and a fatigue sensor connected to an output of said selector, said selector being operable in a first mode and a second mode, said selector selecting said plurality of first optical sensor elements for connecting said plurality of first optical sensor elements to said video telephone in said first mode, and said selector selecting said plurality of second optical sensor elements for connecting said plurality of second optical sensor elements to said fatigue sensor in said second mode.

20. The sensor arrangement of claim 19, further comprising a person identification unit connected to an output of said selector, said selector being further operable in a third mode, said selector selecting said plurality of second optical sensor elements for connecting said plurality of second optical sensor elements to said person identification unit in said third mode.

21. A sensor arrangement for image recognition of an image object, comprising:

a plurality of first optical sensor elements arranged in a raster layout and responding to light in a visible wavelength range;

a plurality of second optical sensor elements responding to light in an invisible wavelength range, wherein said plurality of second optical sensor elements are arranged in the raster layout between the plurality of first optical sensor elements;

a spotlight emitting light with a wavelength only within the invisible wavelength range;

a selector unit connected to said plurality of first optical sensor elements and said plurality of second optical sensor elements for selecting one of said plurality of first optical sensor elements and said plurality of second optical sensor elements, said selector element further connected to said spotlight for selectively activating said spotlight such that the activation of said spotlight is synchronized with the selection of said plurality of second optical sensor elements by said selector unit and deactivation of said spot light is synchronized with the selection of said plurality of first optical sensor elements by said selector unit; and a video telephone and a person identification unit connected to an output of said selector, said selector being selectively operable in first and second modes, said selector selecting said plurality of first optical sensor elements for connecting said plurality of first optical sensor elements to said video telephone in said first mode, and said selector selecting said plurality of second optical sensor elements for connecting said plurality of second optical sensor elements to said person identification unit in said second mode.

* * * * *